(12) United States Patent
Ollila et al.

(10) Patent No.: US 8,189,280 B2
(45) Date of Patent: May 29, 2012

(54) VOICE COIL MOTOR WITH PULSE-WIDTH MODULATION DRIVER

(75) Inventors: Mikko A. Ollila, Tampere (FI); Marko J. Eromaki, Tampere (FI)

(73) Assignee: Nokia Corporation, Espoo (FI)

( * ) Notice: Subject to any disclaimer, the term of this patent is extended or adjusted under 35 U.S.C. 154(b) by 25 days.

(21) Appl. No.: 12/837,900

(22) Filed: Jul. 16, 2010

(65) Prior Publication Data

US 2012/0014002 A1 Jan. 19, 2012

(51) Int. Cl.
*G02B 7/02* (2006.01)
*G02B 15/14* (2006.01)

(52) U.S. Cl. ........ 359/824; 359/814; 359/698; 396/133; 396/55; 396/85; 348/208.11; 369/44.16

(58) Field of Classification Search .......... 359/694–699, 359/823, 824, 557; 396/55, 80, 85, 87, 133, 396/303, 349, 448; 348/208.4, 340, E5.028, 348/E5.045, E5.046

See application file for complete search history.

(56) References Cited

U.S. PATENT DOCUMENTS

| | | | | |
|---|---|---|---|---|
| 4,113,359 A | * | 9/1978 | Koike et al. | 359/230 |
| 4,820,940 A | * | 4/1989 | Wachi et al. | 327/110 |
| 5,070,489 A | * | 12/1991 | Perry et al. | 369/44.16 |
| 6,160,962 A | * | 12/2000 | Nomura et al. | 396/277 |
| 7,113,351 B2 | * | 9/2006 | Hovanky | 359/824 |
| 7,400,068 B2 | * | 7/2008 | Tseng | 310/12.16 |
| 7,440,688 B2 | * | 10/2008 | Uehara et al. | 396/55 |
| 7,612,957 B1 | | 11/2009 | Wu et al. | 359/824 |
| 7,697,218 B2 | | 4/2010 | Ishikawa et al. | 359/697 |
| 7,760,442 B2 | * | 7/2010 | Ishida et al. | 359/698 |
| 7,907,173 B2 | * | 3/2011 | Lee et al. | 348/208.11 |
| 2009/0252488 A1 | | 10/2009 | Eromaki et al. | 396/529 |

OTHER PUBLICATIONS

"Image Stabilization Technology Overview", David Sachs, et al, Mar. 6, 2007, (18 pages).

* cited by examiner

*Primary Examiner* — Loha Ben
(74) *Attorney, Agent, or Firm* — Harrington & Smith

(57) ABSTRACT

An apparatus is provided including a voice coil motor (VCM); a lens connected to the voice coil motor; and a pulse-width modulation (PWM) driver connected to the voice coil motor to at least partially control movement of the lens by the voice coil motor.

17 Claims, 5 Drawing Sheets

VOICE COIL MOTOR WITH PULSE-WIDTH MODULATION DRIVER

BACKGROUND OF THE INVENTION

1. Field of the Invention

The invention relates to a camera and, more particularly, to a system and method for moving a lens.

2. Brief Description of Prior Developments

Voice Coil Motors (VCM) are the most utilized camera auto focus actuators today. They are relatively simple and their structure allows a VCM to be nicely positioned around a lens symmetrically. This means that the largest possibly lens barrel can be fit into a certain camera module footprint. They are simple to control. They are relatively robust.

SUMMARY

The following summary is merely intended to be exemplary. The summary is not intended to limit the scope of the claimed invention.

In accordance with one aspect of the invention, an apparatus is provided comprising a voice coil motor (VCM); a lens connected to the voice coil motor; and a pulse-width modulation (PWM) driver connected to the voice coil motor to at least partially control movement of the lens by the voice coil motor.

In accordance with another aspect of the invention, an apparatus is provided comprising an electromagnetic coil; a lens; and a mechanical connection of the coil to the lens. The connection comprises at least one member between the coil and the lens which is comprised of molded ferromagnetic material which has been molded to a size and shape to at least partially hold the coil and/or the lens.

In accordance with another aspect of the invention, a method is provided comprising moving a lens by use of a voice coil motor; and controlling the voice coil motor by pulse-width modulated electricity to the voice coil motor from a pulse-width modulation (PWM) driver.

In accordance with another aspect of the invention, a method is provided comprising providing a coil carrier of a voice coil motor, a first member of the coil carrier comprising a molded ferromagnetic material; connecting an electromagnetic coil to the coil carrier; and connecting a lens to the coil carrier.

BRIEF DESCRIPTION OF THE DRAWINGS

The foregoing aspects and other features of the invention are explained in the following description, taken in connection with the accompanying drawings, wherein.

DETAILED DESCRIPTION OF EMBODIMENTS

Figure 1:
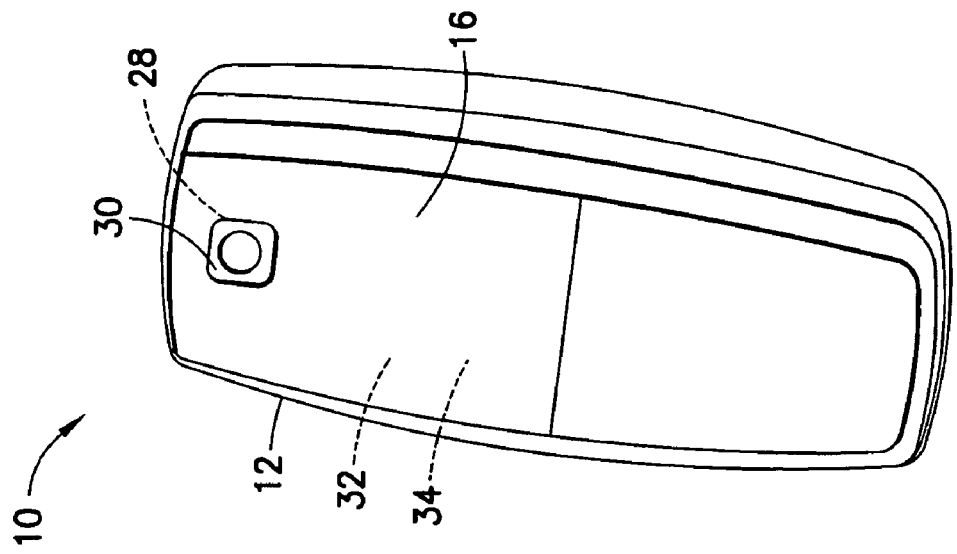
FIG. 1 is a perspective view of a device comprising features of the invention.

Referring to FIG. 1, there is shown a perspective view of an electronic device 10 incorporating features of the invention. Although the invention will be described with reference to the example embodiments shown in the drawings, it should be understood that the invention can be embodied in many alternate forms of embodiments. In addition, any suitable size, shape or type of elements or materials could be used.

Figure 2:
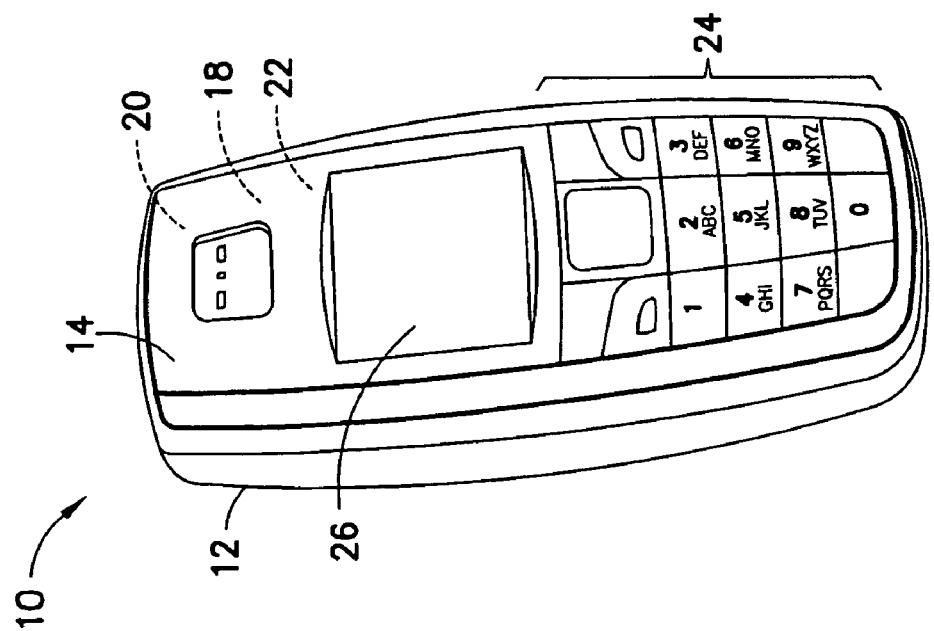
FIG. 2 is a perspective view of an opposite side of the device shown in FIG. 1.

In the embodiment shown in FIGS. 1 and 2, the device 10 comprises a mobile telephone. However, in alternate embodiments the device could comprise any suitable type of electronic device. For example, the device 10 could comprise a digital camera, a digital video recorder, a music player, a hand-held gaming device, a PDA, or a notebook computer. The telephone 10 generally comprises a housing 12 having a front face 14 and a back face 16, electronic circuitry 22 such as including a transceiver 18, an antenna 20, a controller 32 such as a processor, and one or more memories 34. The telephone 10 also generally comprises a user input 24 and a display 26. The display could also form a user input section, such as a touch screen for example. In alternate embodiments, the telephone 10 can have any suitable type of conventional features.

The electronic device 10 further comprises a camera 28 (shown in FIG. 2) mounted to the housing 12. The camera may comprise a camera window 30 located at the back face 16 of the housing 12. However, it should be noted that although the figures illustrate the camera window 30 at the back face 14 of the electronic device 10, alternate embodiments may comprise the camera window at any suitable location. For example, the camera window 30 may be provided at the front face 14 or a lateral side face of the housing 12. Additionally, more than one camera and/or camera window may be provided.

The device 10 has applications, such as software, which the user can use. The applications can include, for example, a telephone application, an Internet browsing application, a game playing application, a digital camera application, etc. These are only some examples and should not be considered as limiting. One or more user inputs 24 are coupled to the controller and one or more displays 26 are coupled to the controller. The device 10 may be programmed to automatically change a position of the lens within the camera module (e.g., autofocus). However, in an alternate embodiment, this might not be automatic. The user might need to actively select a change of the lens position.

Figure 3:
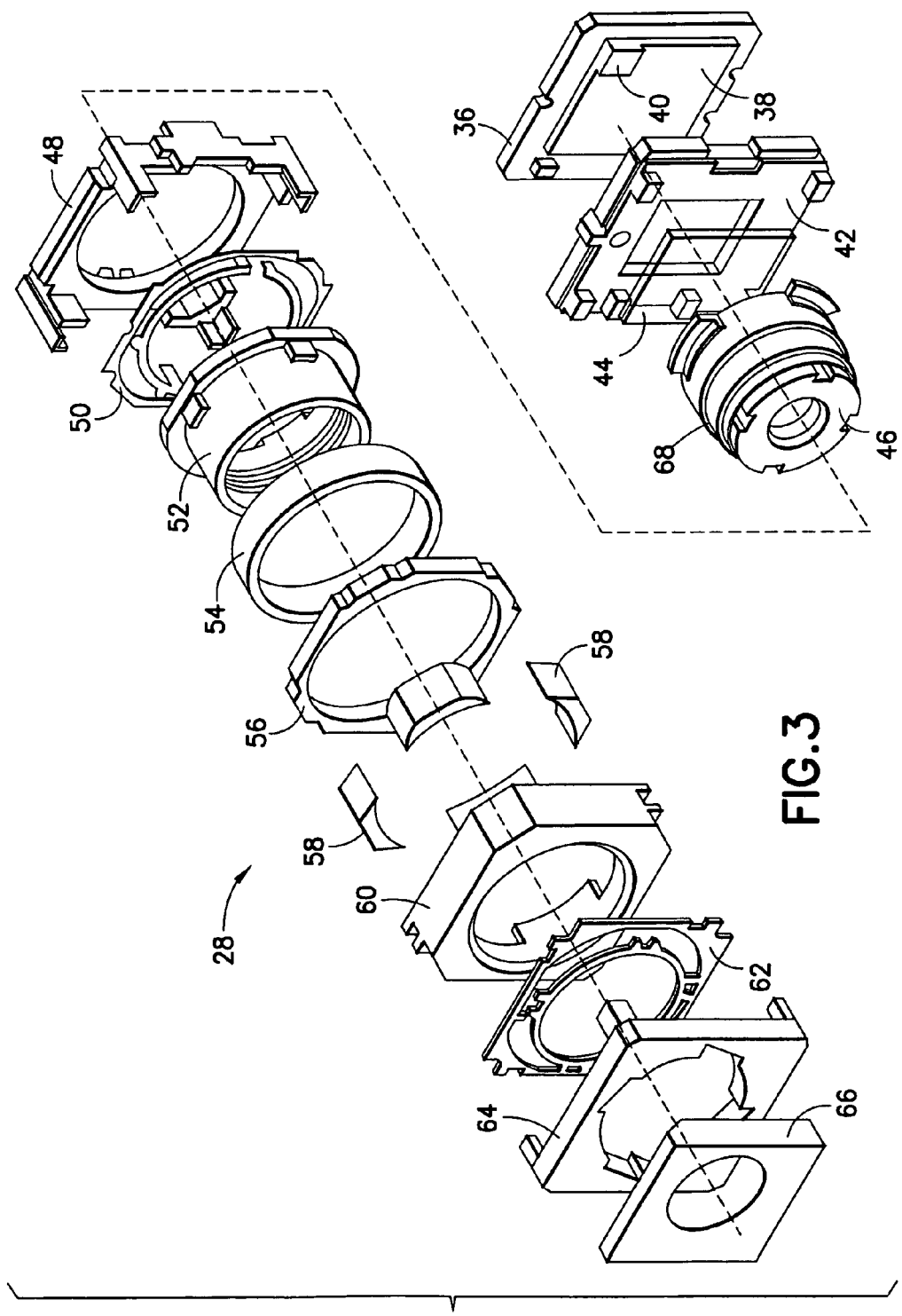
FIG. 3 is an exploded perspective view of a camera module used in the device shown in FIG. 2.

Referring also to FIG. 3, the camera 28 is preferably provided as a module which can be easily assembled with the rest of the device 10.

The camera 28 is provided as an autofocus configuration such as for HD video capture for example. The autofocus configuration comprises a complex voice coil motor (VCM) structure which is located around a lens. The autofocus configuration footprint size may be about 9.5 mm×about 9.5 mm for example. In this example embodiment the camera module 28 comprises a printed wiring board 36 having a sensor 38 and a driver 40 such as an integrated circuit for example, a sensor holder 42, an IR glass 44, a lens and holder assembly 46, a frame base 48, a first spring 50, a coil carrier 52, an electromagnetic coil 54, a spacer 56, permanent magnets 58, a first yoke 60, a second spring 62, a frame top 64, and a top cover 66. This is only an example of a camera module which can comprise features of the invention. Features of the invention could be used in alternate types and constructions of cameras.

Figure 4:
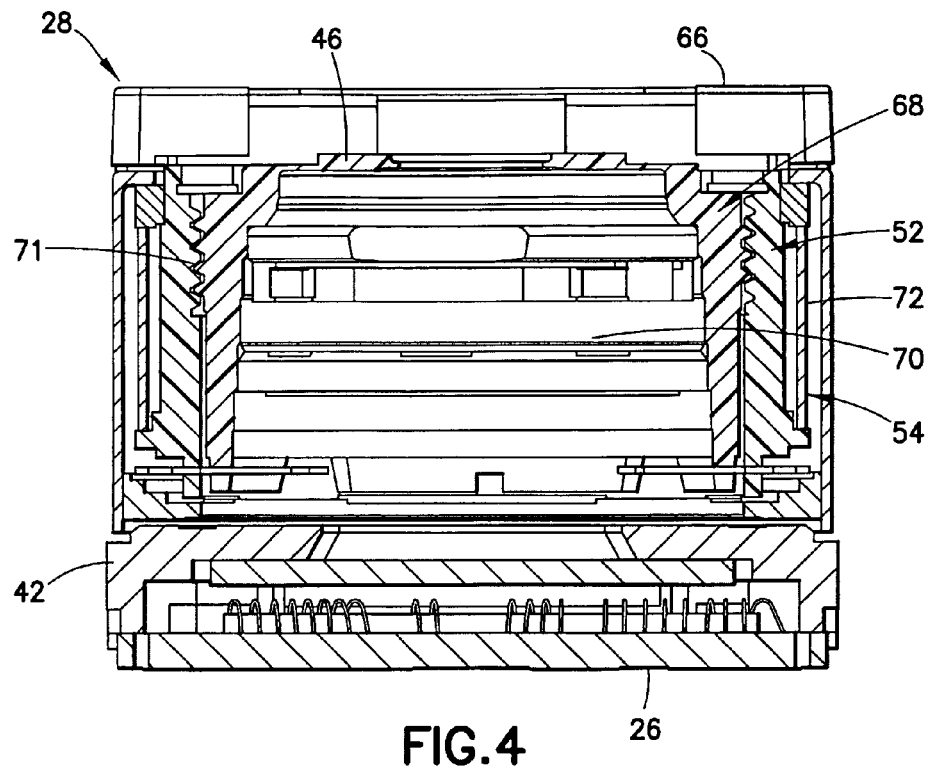
FIG. 4 is a schematic cross sectional view of the camera module shown in FIG. 3.

Referring also to FIG. 4, the lens and holder assembly or barrel assembly 46 generally comprises a lens holder or lens barrel 68 which has the lens 70 mounted therein. The lens holder 68 is fixedly connected to the coil carrier 52 such as by screw threads 71. The coil 54 is fixedly connected around the outside of the coil carrier 52. The assembly 46 can move with the coil carrier 52 and coil 54 relative to the frame 48, 65 by energizing the coil 54. The magnetic field of the coil 54 interacts with the permanent magnets 58 to impart motion to the members 46, 52. The spring 50 can bias the members 46, 52 towards a home position relative to the frame 48, 64.

Figure 5:
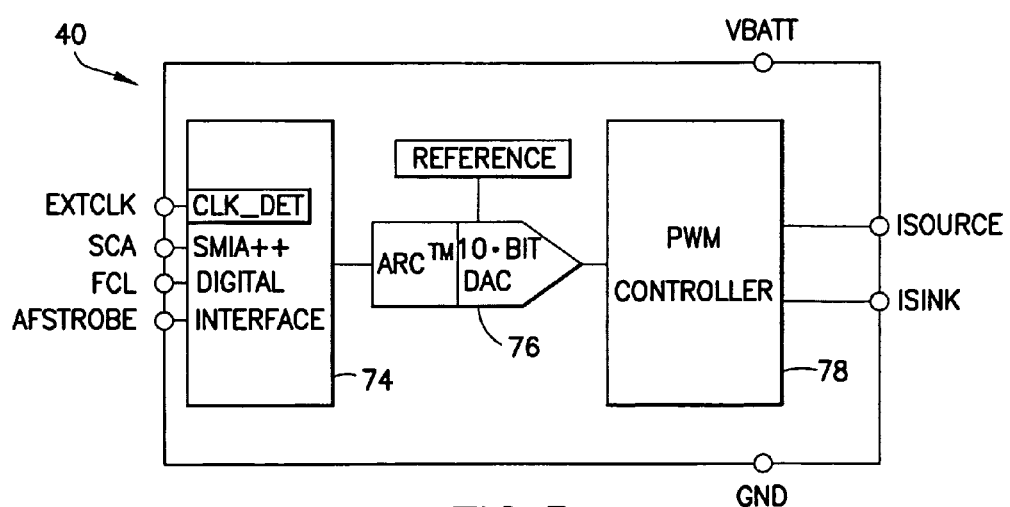
FIG. 5 is a diagram illustrating a Pulse-Width Modulation driver shown in FIG. 3.
Figure 6:
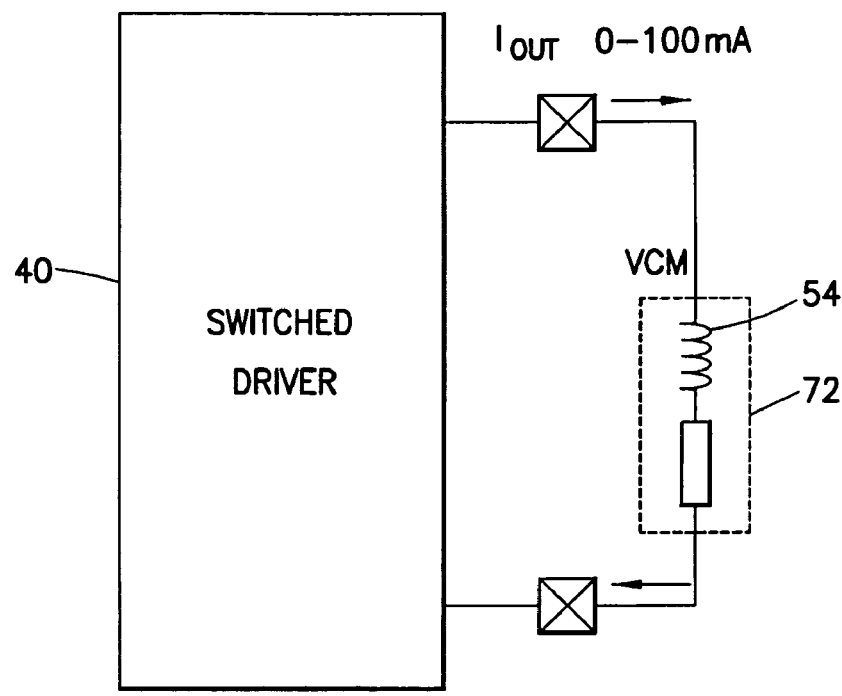
FIG. 6 is a diagram illustrating connection of the driver shown in FIG. 5 to the Voice Coil Motor of the camera module shown in FIG. 3.

Referring also FIG. 6, a voice coil motor (VCM) 72 is formed by the magnets 58 and the coil 52. Referring also to FIG. 5, the driver 40 in this embodiment is a switched driver. In particular, rather than a linear VCM driver, the driver 40 uses pulse-width modulation (PWM). Pulse-width modulation (PWM) is a very efficient way of providing intermediate amounts of electrical power between fully ON and fully OFF. PWM can be used to reduce the total amount of power delivered to a load without losses normally incurred when a power source is limited by resistive means. This is because the average power delivered is proportional to the modulation duty cycle. With a sufficiently high modulation rate, passive electronic filters can be used to smooth the pulse train and recover an average analog waveform.

The example embodiment shown in FIG. 5 comprises a standard mobile imaging architecture (SMIA) digital interface 74, a Digital-to-Analog Converter (DAC) 76 such as an ACR DAC, and a PWM controller 78. However, any suitable switched driver or PWM driver could be provided. As seen in FIG. 6, the switched driver 40 is connected to the VCM 72. Current from the driver 40 can control the motor 72 to energize the coil 54 and thereby move the lens 70 by moving the components 52, 68 due to the interaction of the magnetic fields between the coil 54 and the magnets 58, and due to the spring 50.

An embodiment of the invention makes it possible to more easily utilize a more power efficient driving method than before with a camera module having a VCM. Instead of common linear current through the VCM coil, a PWM type of driving method is utilized. The driving is more efficient because the VCM coil acts as an energy source.

One would ordinarily think that a ripple, current in VCM coil could create EMI. However, an embodiment of the invention can be realized such that this ripple current can be minimized by a large inductance or higher frequency. The coil inductance can be increased by molding the coil carrier 52 by ferromagnetic material that will increase the inductance because the permeability is increased and also the high frequency behavior is better. In one example the coil carrier 52 is molded from metal powder. About a 30 percent increase can be achieved.

Figure 9:
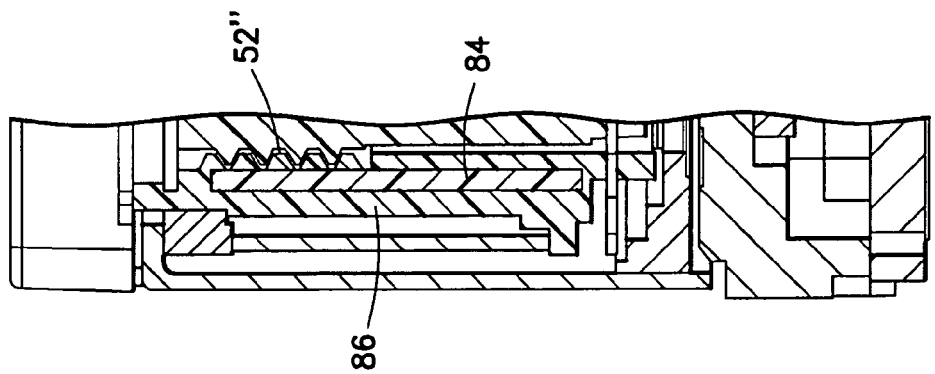
FIG. 9 is a partial cross sectional view similar to FIG. 8 showing another alternate embodiment of the coil carrier.
Figure 8:
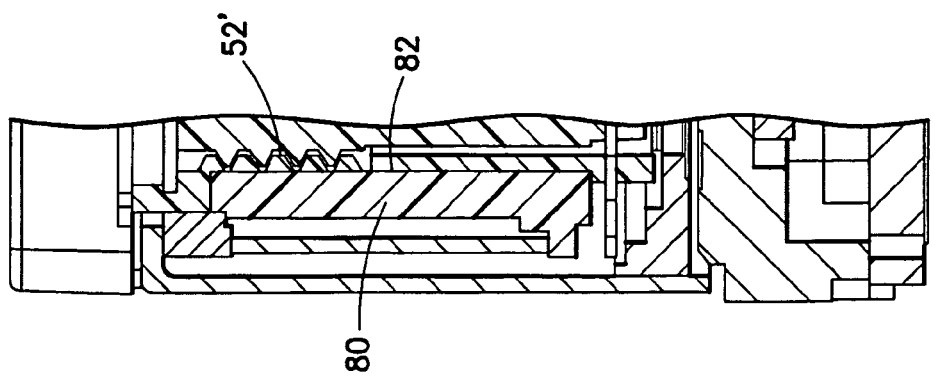
FIG. 8 is a partial cross sectional view similar to FIG. 4 showing an alternate embodiment of the coil carrier.

Also, if the coil carrier is molded with metal powder, the metal powder can act as yoke for coil 54. This can concentrate the magnetic field from the coil 54 in such way that magnetic force generation is increased and less power is needed to move the lens. FIG. 4 shows the coil carrier 52 formed as a single member of molded ferromagnetic material. This second yoke, formed by the coil carrier 52, can be created by a molded ferromagnetic type of material among plastic parts. For example, as seen in FIG. 8 the coil carrier 52' could be formed by molding a first member 80 of ferromagnetic material with a second member 82, such as made of plastic or polymer material. As another example, as seen in FIG. 9 the coil carrier 52" could be formed by molding the first member of ferromagnetic material, and then overmolding a second member 86, such as made of plastic or polymer material over the first member 84. As another example, first member 84 might not be a molded member, but could be a ferromagnetic member formed another way; being substantially covered by the overmolded second member 86.

In the embodiment shown in FIG. 4, in addition to the coil carrier 52 being comprised of a molded ferromagnetic material, the lens holder 68 is also comprised of a molded ferromagnetic material. However, in an alternate embodiment the lens holder 68 might be a conventional lens holder which does not comprise ferromagnetic material. Similar to the embodiments shown in FIGS. 8-9, the lens holder 68 might comprise a first member made of ferromagnetic material and a second member made of plastic of polymer material; such as molded or overmolded with one another. As another alternate embodiment, the coil carrier 52 might be a conventional coil carrier which does not comprise ferromagnetic material and, instead, the lens holder might be the only component of the two components which has a molded ferromagnetic material. However, in the preferred embodiment shown in FIG. 4 both the lens holder and the coil carrier comprise ferromagnetic material.

Rather than using metal powder as the ferromagnetic material, an organic plastic "magnet" type of material could be used. A plastic magnet is a non-metallic magnet made from an organic polymer. One example is PANiCNQ, which is a combination of emeraldine-based polyaniline (PANi) and tetracyanoquinodimethane (TCNQ). It can function at room temperature. PANi is a conductive polymer that is stable in air. When combined with the free radical forming TCNQ as an acceptor molecule it can mimic the mechanism of metallic magnets. The magnetic properties arise from the fully pi-conjugated nitrogen-containing backbone combined with molecular charge transfer side groups. These properties cause the molecule to have a high density of localized spins that can give rise to coupling of their magnetic fields. When a polymer magnet is synthesized, the polymer chains need a long time to line up before displaying any notable magnetism. Thus, fabrication of a member by use of this material can form a ferromagnetic member with reduced permanent magnet properties suitable for use as part of the lens holder 68 or coil carrier 52 described above.

With an embodiment of the invention both force and inductance provided by the motor 72 can be increased. Both the lens holder 68 and the coil carrier 52 could be molded with some ferrite type of material that would increase the inductance and force generation. Force generation is increased and inductance is increased. This will increase the force generation and inductance making it more power efficient to drive the VCM.

An embodiment of the invention can have a lower power consumption than an equivalent sized conventional camera module having a VCM. An embodiment of the invention can have greater force than an equivalent sized conventional camera module having a VCM. Power consumption becomes important especially for High-Definition (HD) video and continuous Auto-Focus (AF) in a hand-held portable device which has limited battery power or which is desired not to need recharging for a few days of continuous use. An embodiment of the invention can have a camera module having a VCM that has a spring, without a need for ball bearings and position sensors.

An embodiment of the invention can be used in a continuous AutoFocus (AF) camera as a feature for a larger video resolution High Definition (HD) camera such as with 720 HD and full 1080p HD. HD cameras should be continuously in focus, otherwise the high resolution does not make sense. Power consumption of AF is an important consideration, due to the relatively long duration of video recording. Ordinarily, one would not look at a conventional voice coil motor (VCM) for a HD camera having continuous AF (in a hand-held portable electronic device such as having a telephone function) because a convention voice coil motor has a high power consumption. However, it has been discovered that PWM based driving, which is a more power efficient driving method, can be used with a VCM in a camera module. An embodiment of the invention can reduce expected EMI (which would occur if VCM inductance was to low), and reduce expected additional power consumption (which would otherwise occur due to a higher ripple current in the VCM). An embodiment of the invention can lower the frequency of the switching and result in a lower power consumption due to reduced switching losses.

A method of increasing the VCM coil inductance can be done by molding ferromagnetic powder material inside a VCM coil carrier and/or the lens holder. By doing this, the ripple current can be reduced and lower switching frequency can be used. EMI is, thus, drastically reduced. Also switching losses are reduced and, thus, power efficiency is further increased. With an embodiment of the invention, a PWM driving method becomes feasible in a small VCM camera, and VCM technology can now be used with HD video capture by a small electronics device such as a camera 28 in a mobile telephone 10. An embodiment of the invention can provide a simple and practical way of increasing the inductance of a VCM for use in a camera module. An embodiment of the invention does not required an increase in the VCM coil wounding rounds. Thus, there does not need to be a larger area/space for the coil on the coil carrier and, without additional wounding rounds, there is no higher resistance, no larger power consumption, and no AC parasitic capacitances increase. An embodiment of the invention does not have to increase the voltage headroom; which may be limited.

An embodiment of the invention can merely comprise one or more molded ferromagnetic members in the VCM (such as the coil carrier and/or the lens holder) inside the camera that is/are close to VCM coil.

Figure 7:
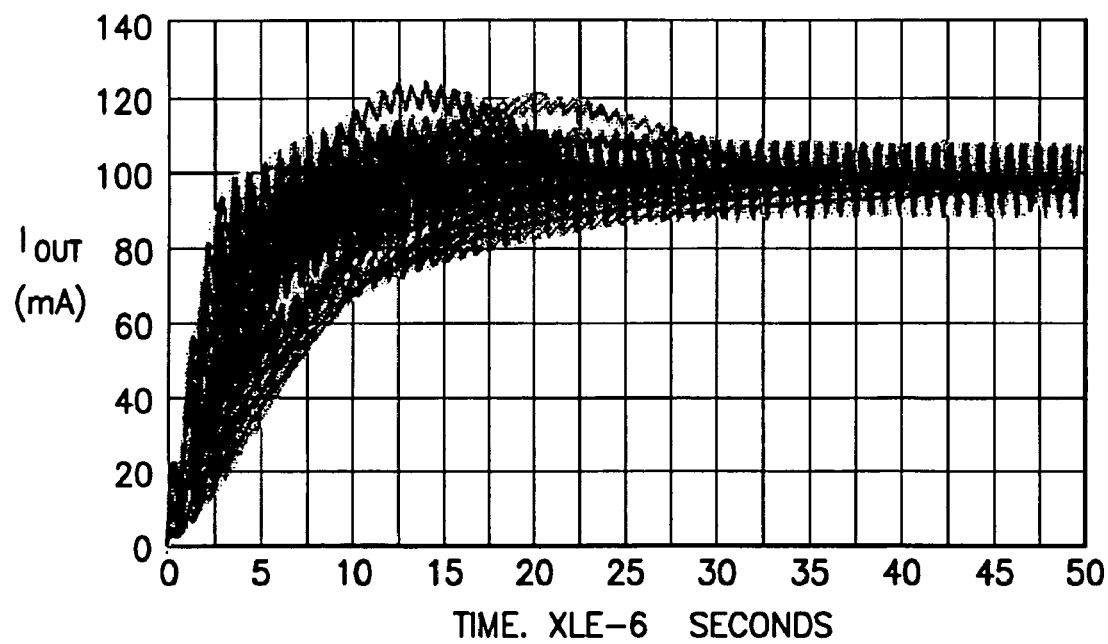
FIG. 7 is a chart illustrating current out from the driver shown in FIG. 5.

To Further illustrate a features of the invention, FIG. 7 shows simulations of current $I_{out}$ from the driver 40 to the motor 72. For these simulations $I_{out}$=100 mA, $R_{VCM}$=1.25 MHz, and for overall processes $V_{DD}$=2.3V, 4.8V; $R_{VCM}$=100Ω, 20Ω; $L_{VCM}$=60 uH, 160 uH; Temp=−40, 125; and capacitance $C_{PCB}$=1 pF, 50 pF. However, other specifications could be provided.

An apparatus can be provided comprising a voice coil motor 72; a lens 70 connected to the voice coil motor; and a pulse-width modulation driver 40 connected to the voice coil motor to at least partially control movement of the lens by the voice coil motor. A lens holder 68 can connect the lens to the voice coil motor, and the lens holder can comprise a ferromagnetic member comprising molded ferromagnetic material which has been molded to a size and shape to at least partially hold the lens. The voice coil motor can comprise a coil carrier 52 having an electromagnetic coil 54 connected thereto, the coil carrier being connected to the lens by the lens holder. The molded ferromagnetic material can be a non-metallic organic polymer material. The lens holder 68 can comprise a polymer member on the ferromagnetic member which is size and shape to cooperate with the ferromagnetic member to at least partially hold the lens. The polymer member can be an overmolded member which has been overmolded over the ferromagnetic member. The voice coil motor comprises a coil carrier having an electromagnetic coil connected thereto, the coil carrier comprising a ferromagnetic member comprising molded ferromagnetic material which has been molded to a size and shape to at least partially hold the coil. The molded ferromagnetic material can comprise a non-metallic organic polymer material. The voice coil motor can comprise means for increasing inductance to reduce ripple current and reduce creation of ElectroMagnetic Interference (EMI) comprising a ferromagnetic member configured to act as a yoke for a coil of the voice coil motor. The ferromagnetic member can be located between the coil and the lens. The apparatus can be an autofocus camera module.

An apparatus can be provided comprising an electromagnetic coil 54; a lens 70; and a mechanical connection of the coil to the lens, the connection comprising at least one member between the coil and the lens which is comprised of molded ferromagnetic material which has been molded to a size and shape to at least partially hold the coil and/or the lens. The apparatus can comprise a voice coil motor 72, a coil carrier 52 of the voice coil motor comprising the at least one member. The mechanical connection can comprise a lens holder 68 connected to the lens, the lens holder comprising the at least one member between the coil and the lens. A pulse-width modulation driver 40 can be connected to coil and configured to at least partially control movement of the lens.

A method can be provided comprising moving a lens by use of a voice coil motor; and controlling the voice coil motor by pulse-width modulated electricity to the voice coil motor from a pulse-width modulation driver.

A method of manufacture can be provided comprising providing a coil carrier of a voice coil motor, a first member of the coil carrier comprising a molded ferromagnetic material; connecting an electromagnetic coil to the coil carrier; and connecting a lens to the coil carrier. The method can comprise connecting a pulse-width modulation driver to the electromagnetic coil. Connecting the lens to the coil carrier can comprise connecting a lens holder to the coil carrier, and the method can further comprise providing the lens holder with a second member comprising a molded ferromagnetic material.

It should be understood that the foregoing description is only illustrative of the invention. Various alternatives and modifications can be devised by those skilled in the art without departing from the invention. For example, features recited in the various dependent claims could be combined with each other in any suitable combination(s). In addition, features from different embodiments described above could be selectively combined into a new embodiment. Accordingly, the invention is intended to embrace all such alternatives, modifications and variances which fall within the scope of the appended claims.

What is claimed is:
1. An apparatus comprising:
a voice coil motor;
a lens connected to the voice coil motor;
a pulse-width modulation driver connected to the voice coil motor to at least partially control movement of the lens by the voice coil motor; and
a lens holder connecting the lens to the voice coil motor, the lens holder comprising a ferromagnetic member comprising molded ferromagnetic material which has been molded to a size and shape to at least partially hold the lens.

2. An apparatus as in claim 1 wherein the voice coil motor comprises a coil carrier having an electromagnetic coil connected thereto, the coil carrier being connected to the lens by the lens holder.

3. An apparatus as in claim 1 wherein the molded ferromagnetic material is a non-metallic organic polymer material.

4. An apparatus as in claim 1 wherein the lens holder comprises a polymer member on the ferromagnetic member which is sized and shaped to cooperate with the ferromagnetic member to at least partially hold the lens.

5. An apparatus as in claim 4 wherein the polymer member is an overmolded member which has been overmolded over the ferromagnetic member.

6. An apparatus as in claim 1 wherein the apparatus is an autofocus camera module.

7. A device comprising:
   a housing;
   electronic circuitry in the housing; and
   an autofocus camera module as in claim 6 connected to the housing and operably connectable to the electronic circuitry.

8. An apparatus comprising:
   a voice coil motor;
   a lens connected to the voice coil motor; and
   a pulse-width modulation driver connected to the voice coil motor to at least partially control movement of the lens by the voice coil motor,
   wherein the voice coil motor comprises a coil carrier having an electromagnetic coil connected thereto, the coil carrier comprising a ferromagnetic member comprising molded ferromagnetic material which has been molded to a size and shape to at least partially hold the coil.

9. An apparatus as in claim 8 wherein the molded ferromagnetic material is a non-metallic organic polymer material.

10. An apparatus comprising:
    a voice coil motor;
    a lens connected to the voice coil motor; and
    a pulse-width modulation driver connected to the voice coil motor to at least partially control movement of the lens by the voice coil motor,
    wherein the voice coil motor comprises means for increasing inductance to reduce ripple current and reduce creation of ElectroMagnetic Interference (EMI) comprising a ferromagnetic member configured to act as a yoke for a coil of the voice coil motor.

11. An apparatus as in claim 10 wherein the ferromagnetic member is located between the coil and the lens.

12. An apparatus comprising:
    an electromagnetic coil;
    a lens; and
    a mechanical connection of the coil to the lens, the connection comprising at least one member between the coil and the lens which is comprised of molded ferromagnetic material which has been molded to a size and shape to at least partially hold the coil and/or the lens; and
    a pulse-width modulation driver connected to the coil and configured to at least partially control movement of the lens.

13. An apparatus as in claim 12 wherein the apparatus further comprises a voice coil motor, a coil carrier of the voice coil motor comprising the at least one member.

14. An apparatus as in claim 13 wherein the mechanical connection further comprises a lens holder connected to the lens, the lens holder comprising the at least one member between the coil and the lens.

15. An apparatus comprising:
    an electromagnetic coil;
    a lens; and
    a mechanical connection of the coil to the lens, the connection comprising at least one member between the coil and the lens which is comprised of molded ferromagnetic material which has been molded to a size and shape to at least partially hold the coil and/or the lens, wherein the mechanical connection further comprises a lens holder connected to the lens, the lens holder comprising the at least one member which is comprised of molded ferromagnetic material.

16. A method comprising:
    providing a coil carrier of a voice coil motor, a first member of the coil carrier comprising a molded ferromagnetic material;
    connecting an electromagnetic coil to the coil carrier;
    connecting a lens to the coil carrier; and
    connecting pulse-width modulation driver to the electromagnetic coil.

17. A method as in claim 16 wherein connecting the lens to the coil carrier comprises connecting a lens holder to the coil carrier, and the method further comprises providing the lens holder with a second member comprising a molded ferromagnetic material.

* * * * *